US009560018B2

(12) United States Patent
Bellagamba et al.

(10) Patent No.: US 9,560,018 B2
(45) Date of Patent: Jan. 31, 2017

(54) AUTONOMIC LOCATOR/IDENTIFIER SEPARATION PROTOCOL FOR SECURE HYBRID CLOUD EXTENSION

(71) Applicant: CISCO TECHNOLOGY, INC., San Jose, CA (US)

(72) Inventors: Patrice Bellagamba, Saint-Raphael (FR); Michael H. Behringer, La Colle sur Loup (FR); Santiago Vazquez Freitas, Feltham (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 171 days.

(21) Appl. No.: 14/563,688

(22) Filed: Dec. 8, 2014

(65) Prior Publication Data
US 2016/0164832 A1  Jun. 9, 2016

(51) Int. Cl.
*H04L 29/06* (2006.01)
*H04L 29/08* (2006.01)
*H04L 29/12* (2006.01)
*H04L 12/715* (2013.01)

(52) U.S. Cl.
CPC .......... *H04L 63/0281* (2013.01); *H04L 45/64* (2013.01); *H04L 61/103* (2013.01); *H04L 61/2084* (2013.01); *H04L 67/10* (2013.01); *H04L 67/141* (2013.01); *H04L 67/2819* (2013.01)

(58) Field of Classification Search
CPC .. H04L 63/0209; H04L 67/10; H04L 63/0281; H04L 67/2819; H04L 67/141
USPC ...................................... 726/11, 12
See application file for complete search history.

(56) References Cited

U.S. PATENT DOCUMENTS

| 2013/0103819 | A1 | 4/2013 | Meyer et al. |
| 2013/0318343 | A1 | 11/2013 | Bjarnason et al. |
| 2013/0318570 | A1* | 11/2013 | L. ............................ H04L 63/20 726/4 |
| 2014/0192808 | A1 | 7/2014 | Thubert et al. |
| 2014/0201516 | A1 | 7/2014 | Bjarnason et al. |

(Continued)

OTHER PUBLICATIONS

Cisco Systems, Inc., "Autonomic Networking Configuration Guide, Cisco IOS Release 15S," 2013 Cisco Systems, Inc., 24 pages.

(Continued)

*Primary Examiner* — Baotran N To
(74) *Attorney, Agent, or Firm* — Patent Capital Group

(57) ABSTRACT

A method is provided in one example embodiment and includes configuring a local network element as an autonomic registrar for a designated network domain; establishing an autonomic control plane ("ACP") between the local network element and one or more remote network elements identified by local network element as a remote neighbor; designating a locally-defined subnet at the local network element to be extended to each of the one or more remote network elements; and executing an ACP command at the local network element, wherein the executing triggers a message to each of the one or more remote network elements, the message including information regarding the designated local subnet. The information included in the message is used by each of the remote network elements to auto-resolve its Locator/Identifier Separation Protocol ("LISP") configuration, enabling the designated local subnet to be extended to each of the one or more remote network elements.

20 Claims, 6 Drawing Sheets

(56) References Cited

U.S. PATENT DOCUMENTS

2014/0215028 A1 7/2014 Donner et al.
2014/0215580 A1 7/2014 Behringer et al.

OTHER PUBLICATIONS

Cisco Systems, Inc., "Autonomic Networking" Cisco Systems, Inc., Last Published Date: Mar. 30, 2014, 14 pages.
Freitas, et al., "Using LISP for Secure Hybrid Cloud Extension," Internet Draft, Feb. 12, 2014, 14 pages; http://tools.ietf.org/pdf/draft-freitas-bellagamba-lisp-hybrid-cloud-usecase-00.pdf.
Behringer, et al., "Autonomic Networking Use Case for Network Bootstrap," Internet-Draft, May 9, 2014, 7 pages; http://tools.ietf.org/pdf/draft-behringer-autonomic-control-plane-00.pdf.
Behringer, et al., "An Autonomic Control Plane", Internet-Draft, Jun. 20, 2014, 10 pages; http://tools.ietf.org/pdf/draft-behringer-autonomic-bootstrap-00.pdf.
Cisco Systems, Inc., "Deploying a Secure Hybrid Cloud Extension with Cisco CSR 100V and LISP," 2014 Cisco Systems, Inc., 32 pages; http://www.cisco.com/c/en/us/products/collateral/routers/cloud-services-router-1000v-series/white-paper-c11-731872.pdf.
PCT Jul. 25, 2016 International Search Report and Written Opinion from International Application Serial No. PCT/US2015/062725; 13 pages.

\* cited by examiner

AUTONOMIC LOCATOR/IDENTIFIER SEPARATION PROTOCOL FOR SECURE HYBRID CLOUD EXTENSION

TECHNICAL FIELD

This disclosure relates in general to the field of communications networks and, more particularly, to an autonomic Locator/Identifier Separation Protocol ("LISP") for enabling secure hybrid cloud extensions for such networks.

BACKGROUND

A variety of enterprises have recently been pursuing a hybrid cloud computing strategy in response to various system demands. Such enterprises may seek to migrate servers to a cloud-based infrastructure without making any changes to them. In particular, enterprise server administrators may prefer to avoid changing a server's IP address, subnet mask, and default gateway configurations, and may also prefer to adopt an IP addressing scheme in the cloud that is different than that of the cloud service provider. Locator/Identifier Separation Protocol ("LISP") can be used to address these requirements. In particular, LISP separates device location and identity, thereby allowing an enterprise to migrate an existing server to or create a new server on the cloud using the same IP address, subnet mask, and default gateway configurations as the server inside the enterprise's own data center. In this manner, LISP enables IP mobility from a data center administered by the enterprise toward a cloud infrastructure owned by a cloud provider. Such a solution, which may be referred to as "hybrid cloud extension using LISP," may be complex to implement, as it requires manual configuration of LISP, IPsec, and dynamic routing protocols, which requires knowledge and configuration expertise in multiple areas. As a result, manual configuration leaves much room for configuration error and is difficult to debug in the case of such error.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

Figure 1:
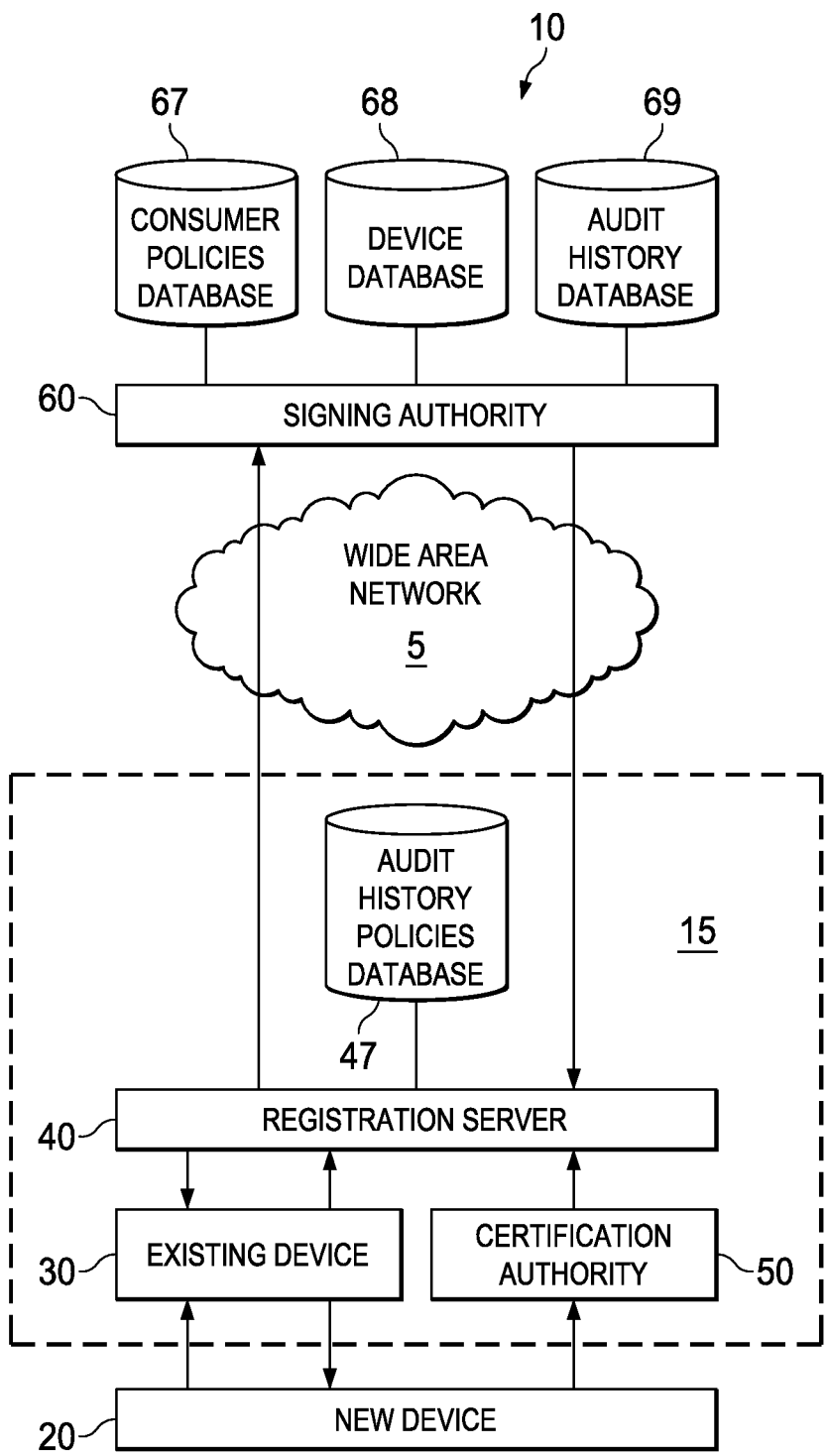
FIG. 1 is a simplified block diagram of an example network environment in which a system for enabling unconfigured devices to join autonomic networks in a secure manner may be implemented.

A method is provided in one example embodiment and includes configuring a local network element as an autonomic registrar for a designated network domain; establishing an autonomic control plane ("ACP") between the local network element and one or more remote network elements identified by local network element as a remote neighbor; designating a locally-defined subnet at the local network element to be extended to each of the one or more remote network elements; and executing an ACP command at the local network element, wherein the executing triggers a message to each of the one or more remote network elements, the message including information regarding the designated local subnet. The information included in the message is used by each of the remote network elements to auto-resolve its Locator/Identifier Separation Protocol ("LISP") configuration, enabling the designated local subnet to be extended to each of the one or more remote network elements.

In some embodiments, the message may be sent via the ACP and the information included in the message may identify at least one of a LISP mode in which the remote network element is to operate, an index of a LISP interface, the designated local subnets, a default gateway for each of the designated local subnets, an Internet Protocol ("IP") address for a proxy egress tunnel router ("PeTR"), an IP address for a map server function, and an IP address for a map resolver function. In certain embodiments, the local network element is deployed in an enterprise data center and the one or more remote network elements are deployed in a public cloud network. Additionally, each of the local network element and the one or more remote network elements may be implemented using LISP-enabled routers.

The method may further include creating at the local network element a local LISP loopback interface and enabling routing on the local LISP loopback interface; and establishing secure IP tunnels between the local network element and each of one or more remote network elements. The local network element may be implemented as a proxy ingress/egress tunnel router ("PxTR") and each of the one or more remote network elements may be implemented as an ingress/egress tunnel router ("xTR").

Example Embodiments

Embodiments described herein employs autonomic technology to automate the deployment of secure hybrid cloud extension using LISP, which is defined in "Using LISP for Secure Hybrid Cloud Extension" (draft-freitas-bellagamba-lisp-hybrid-cloud-usecase-00) (hereinafter referred to as "draft-freitas"), which is hereby incorporated by reference in its entirety. As a result of embodiments described herein, enterprise customers will not need to have any detailed understanding of LISP, IPsec, and dynamic routing protocols to deploy autonomic LISP for enabling a secure hybrid cloud extension. Additionally, the embodiments will enable zero-touch provisioning of configuration on the service provider cloud sites. Still further, embodiments will massively simplify configuration of routers on the enterprise side and will automate the discovery of endpoint identifiers ("EIDs") in the enterprise site.

In accordance with features of embodiments described herein, an Autonomic Control Plane ("ACP"), which can be viewed as a virtual out-of-band channel and implements a self-managing overlay network may be used to implement an autonomic LISP for secure hybrid cloud technique described herein. In certain embodiments, an ACP can generally be implemented as follows. Each autonomic device has a globally unique domain certificate, with which it can cryptographically assert its membership in a particular domain. Adjacency discovery exchanges identity information about neighbors and populates an "adjacency table" comprising a table of information of adjacent neighbors, or peers or remotely configured neighbors. Each neighbor is identified by a globally unique device identifier ("UDI"). The adjacency table contains the following information about the adjacent or remote neighbors:

1. globally valid UDI;
2. link local or remote IP address;
3. trust information; and
4. Validity of the trust.

Each neighbor, or peer, in the adjacency table is authenticated and the result is stored in the adjacency table. In particular, if a domain certificate presented is validated to be in the same domain as that of the autonomic entity, then the neighbor is deemed to be inside the autonomic domain, in which case, an ACP channel will be established. If there is no domain certificate presented by the neighbor or if the domain certificate presented is invalid or expired, then the neighbor is deemed to be outside the autonomic domain and no ADP channel will be established.

To establish a trusted secure communication channel, devices must be able to negotiate with each neighbor a set of parameters (most notably, channel type and security type) for establishing the communication channel. The channel type could be any tunnel mechanism that is feasible between two adjacent neighbors, such as a GRE tunnel. The security type could be any of the channel protection mechanism available between two adjacent neighbors on a given channel type, such as IPsec. The establishment of the ACP can occur after the channel type and security type are negotiated.

After authentication and capability negotiation, autonomic nodes establish a secure channel toward their direct autonomic network ("AN") neighbors using the negotiated parameters. These channels may be implemented as a secure IP tunnel (e.g., IPsec), using IPv6 link local addresses or using IPv4 or IPv6 global addresses, between two adjacent neighbors. The ACP is in a separate context from the normal data plane of the devices. This context includes the ACP channels IPv6/IPv4 forwarding and routing, as well as any required higher layer ACP functions. The channels described above establish communication between two adjacent neighbors; in order for the communication to occur across multiple hops, as is the case required for autonomic locator/identifier separation protocol for secure hybrid cloud extension, the ACP requires network-wide valid addresses and routing. Each autonomic node must create a loopback interface with a network-wide unique address (e.g., Unique Local Address ("ULA")) inside the ACP context. Once these addresses are established, all autonomic entities should run a routing protocol within the autonomic control plane context. The routing protocol distributes the addresses for reachability. The establishment of the routing plane and its parameters are automatic and within the confines of the ACP; therefore, no manual configuration is required. It will be recognized that the routing protocol inside the ACP should be lightweight and scalable to ensure that the ACP does not become a limiting factor in network scalability. In one embodiment, IPv6 Routing Protocol for Low-Power and Lossy Networks ("RPL") may be used as the ACP routing protocol. Additional details regarding ACP may be found in "An Automatic Control Plane" (draft-behringer-autonomic-control-plane-00) (hereinafter referred to as "draft-behringer"), which is hereby incorporated by reference in its entirety.

FIG. 1 is a simplified block diagram of a network environment 10 in which an example system for enabling unconfigured devices to join an autonomic network in a secure manner may be implemented in accordance with current technology. In network environment 10, an exemplary autonomic network domain 15 is illustrated and includes autonomic elements such as an existing device 30 and a registration server 40. An audit history policies database 47 may be provided with policies related to the audit histories of autonomic devices that attempt to join domain 15. A certification authority 50 may also be provided in domain 15. In addition, domain 15 could also include a wide variety of other computing devices such as desktops, laptops, smart phones (i.e., cellular phones with computing capabilities), personal digital assistants (PDAs), tablets, etc., and network elements such as routers, gateways, firewalls, switches, servers, etc. A new device 20, which is autonomic and initially unconfigured, can be introduced to domain 15 and can communicate with registration server 40, either directly or via existing device 30.

Registration server 40 may be configured to communicate to other networks and cloud services via wide area network 5 (e.g., the Internet). A signing authority 60 may be provided as a cloud service in wide area network 5, and may be administered by a manufacturer of autonomic devices such as new device 20. Alternatively, signing authority 60 may be provided locally as part of autonomic network 15. A customer policies database 67 may be provided to allow customers (i.e., entities who acquire or otherwise control autonomic devices of the manufacturer) to request policies to be dynamically applied to their autonomic devices and/or domains. A device database 68 may be provided to include identifications of autonomic devices of a manufacturer and possibly identifications of domains to which they belong. An audit history database 69 may be provided to include audit histories of the autonomic devices. Databases 67-69 can be implemented locally or remotely to signing authority 60.

In example embodiments, a system and method for enabling unconfigured devices to securely join an autonomic network domain may be implemented in network environment 10 by providing registration server 40 and a locally or remotely implemented signing authority 60. Registration server 40 creates an initial basic registration information package (hereinafter "initial information package") identifying the domain and the new device that is attempting to join the domain. Registration server 40 communicates the initial information package to signing authority 60. Signing authority 60 can validate the new device and create an authorization token that links the new device with the domain, and signals the new device that it is permitted to join the domain. Registration server 40 can verify the audit history of the new device and create a completed information package that includes the authorization token. The completed information package is sent to the new device, which can then validate and accept the completed information package, and use the information in the completed information package to join the autonomic network domain.

Certain terminologies are used herein with regard to the various embodiments of the present disclosure. The term "information" as used herein, refers to any type of binary, numeric, or textual data, or any other suitable data in any appropriate format that may be communicated from one point to another in electronic devices (e.g., computing devices, network elements) and/or networks.

A system for enabling unconfigured devices to join an autonomic network in an automated and secure manner, as shown in FIG. 1, can resolve many of these issues. FIG. 1 illustrates one embodiment in which a new device securely authenticates a network infrastructure without imposing manual configuration or unsecure infrastructure assumptions. In the system of FIG. 1, the autonomic network domain authenticates the new device, and the new device authenticates the autonomic network domain by leveraging credentials in the new device (e.g., a unique device identifier (UDI) and a manufacturer's root public key), and a trusted signing authority (e.g., a manufacturer of the new device) to create a secure trust-chain. More particularly, a new device can verify that its attempt to join an untrusted domain is audited by the trusted signing authority. The new device verifies that its actions are audited and authorized by the signing authority (e.g., by verifying its signature on an authorization token) and by verifying the signing authority itself is trusted, without actually communicating with the signing authority. In addition, the new domain can verify that previous audit entries related to the new device are acceptable according to domain policy. In particular, policy decisions and audit log decisions can be performed by a registration server of the untrusted domain. Thus, it is acceptable for the signing authority to authorize "insecure" actions such as new devices joining unknown domains so long as such actions are properly audited. Furthermore, in some scenarios, customer policies can be implemented on a per device and/or per domain basis by the signing authority. Accordingly, a flexible system is provided in which a new device that is "out of the box" with no initial configuration can automatically join an autonomic network in a zero-touch, secure manner. Additionally, the system's flexibility enables the customer to dynamically control and manage desired policies through a registration server and potentially, through the signing authority.

Turning to the infrastructure of FIG. 1, network environment 10 represents a series of points or nodes of interconnected communication paths for receiving and transmitting packets of information that propagate through the system. Nodes of FIG. 1 may be coupled to one another through one or more interfaces employing any suitable connection (wired or wireless), which provides a viable pathway for electronic communications. Network environment 10 can include any local area network (LAN), wireless local area network (WLAN), metropolitan area network (MAN), Intranet, Extranet, wide area network (e.g., WAN 5), virtual local area network (VLAN), virtual private network (VPN), or any other appropriate architecture or system that facilitates communications in a network environment.

Network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs. Additionally, any one or more of the nodes in FIG. 1 may be combined or removed from the architecture based on particular configuration needs.

In one example embodiment, domain 15 can be configured in any suitable form (e.g., an Intranet or Extranet, a local area network (LAN), wide area network (WAN), wireless local area network (WLAN), virtual local area network (VLAN), etc.) using private address space. A "domain" as used herein, refers to an autonomic network (or a portion thereof) in which nodes, such as network elements and other computing devices, can be authenticated and registered or enrolled by a security element (e.g., registration server 40) and within which the configured and authenticated nodes can communicate. An "autonomic network" refers to a computer network in which nodes interact autonomously with each other and based on those interactions can form an end to end network without requiring human intervention in a secure manner. The nodes in the network are capable of interpreting network wide instructions and can aggregate network wide information before handing it over to a network management entity.

In particular, domain 15 represents an autonomic network (or a portion thereof) in which registration server 40, existing device 30, and certification authority 50 are configured and authenticated. New device 20 represents an unconfigured machine within a connectivity range of a configured and authenticated machine within autonomic network domain 15, such as existing device 30. The connectivity range could include a wireless connectivity range when new device 20 and existing device 30 are both configured with wireless connection capabilities such as network interface controllers (WNICs). In other scenarios, the unconfigured new device 20 could be directly connected (e.g., via Ethernet, token ring, etc.) to existing device 30.

Domain 15 may be connected, through appropriate network elements (e.g., routers, bridges, switches, gateways, firewalls, etc.), to another private network, a public network (e.g., WAN 5), or a combination of public and private networks. In one example embodiment, registration server 40 can communicate with signing authority 60 through the Internet (e.g., WAN 5). In this embodiment, network domain 15 may be connected to the Internet by any appropriate medium including, for example, digital subscriber lines (DSL), telephone lines, T1 lines, T3 lines, wireless, satellite, fiber optics, cable, Ethernet, etc. or any combination thereof. Alternatively, domain 15 and signing authority 60 may not be connected by a network and could communicate via manual methods.

Typically, a domain and its nodes are associated with a customer or entity (e.g., business enterprise, government organization, nonprofit organization, educational organization, etc.). A customer or entity can be associated with a domain if it owns, controls, or otherwise legitimately exercises authority over and/or makes decisions regarding the domain. Customers or entities may buy, lease, license, or otherwise acquire autonomic devices from a manufacturer, in accordance with this specification. As used herein, "customer" may be used interchangeably with "entity."

It should be understood that while an example network 10 has been shown and described herein, the system and method of the present disclosure may be implemented in any network environment capable of supporting the architecture. Accordingly, the description with reference to network environment 10 should be not be construed to imply architectural limitations, but rather, should be construed as illustrative.

Figure 2:
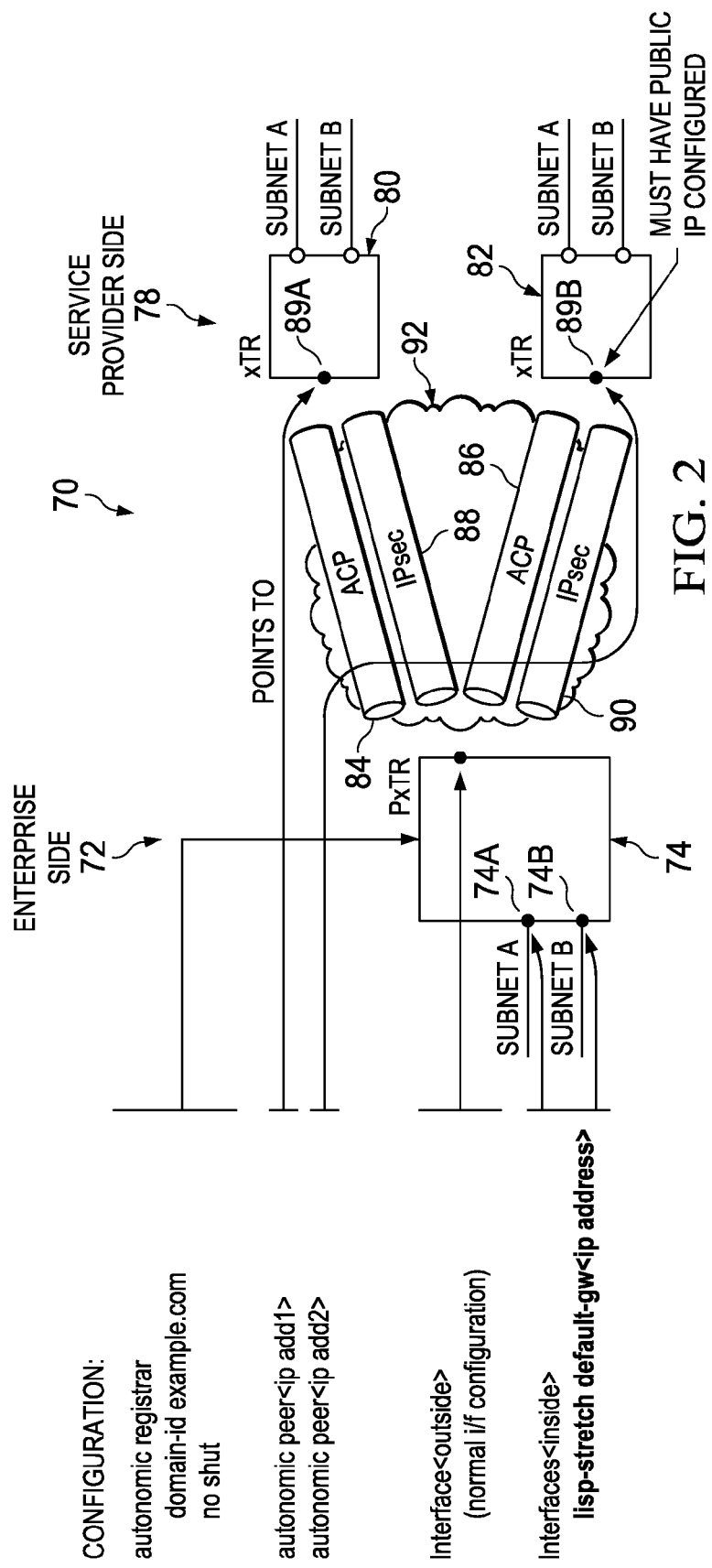
FIG. 2 is a simplified block diagram of a system for implementing autonomic LISP for enabling a secure hybrid cloud extension in accordance with features of embodiments described herein.

Turning now to FIG. 2, illustrated therein is a simplified block diagram of a system 70 for implementing autonomic LISP for enabling a secure hybrid cloud extension in accordance with features of embodiments described herein. As shown in FIG. 2, an enterprise side 72 of the system 70 (which may comprise a data center) includes a proxy ingress/egress tunnel router ("PxTR") 74 having two or more locally-defined subnets accessible via internal interfaces 76A, 74B, of the PxTR. In particular, as illustrated in FIG. 2, interface 76A provides connectivity to a first one of the locally-defined subnets ("Subnet A") and interface 74B provides connectivity to a second one of the locally-defined subnets ("Subnet B"). A service provider ("SP") side 78 of the system 70 (which may comprise a cloud SP) includes one or more ingress/egress tunnel routers ("xTRs") 80, 82. As shown in FIG. 2, an ACP, as represented by tunnels 86, 84, and IPsec tunnels 90, 88, are established between PxTR 74 and xTRs 80, 82, in the manner described above with reference to FIG. 1. In particular, PxTR 74 has been configured as the autonomic registrar of a domain designated "example.com" and xTR 80 and xTR 82 have been established as autonomic peers of PxTR 74 using their respective public IP addresses (i.e., "ip add1" and "ip add2"), respectively designated by reference numerals 89A and 89B. Additionally, an outside interface of PxTR 74 is configured in a conventional fashion.

In accordance with features of embodiments described herein, a device that takes on the registrar function serves as a trust anchor for the domain (e.g., PxTR 74). The registrar contains a registration authority and a certificate authority, subsequently granting domain certificates to other devices (e.g., xTRs 80, 82). The function of the registrar is essentially transparent to a user.

In accordance with features of embodiments described herein, a new ACP command, designated herein as "lisp-stretch," is introduced and, when executed, triggers formation of a LISP-based secure hybrid cloud extension 92 by "stretching," or extending, designated locally-defined subnets (e.g., Subnet A and Subnet B) to remote sites (e.g., xTRs 80 and 82). In embodiment, the subnets to be stretched to the remote nodes are labeled with "lisp-stretch". As will be described in greater detail below, information contained in the message triggered by the lisp-stretch command enables each of xTRs 80, 82, to auto-resolve its LISP configuration, thereby enabling establishment of a secure hybrid cloud extension automatically and autonomously on the SP side 78.

Figure 3:
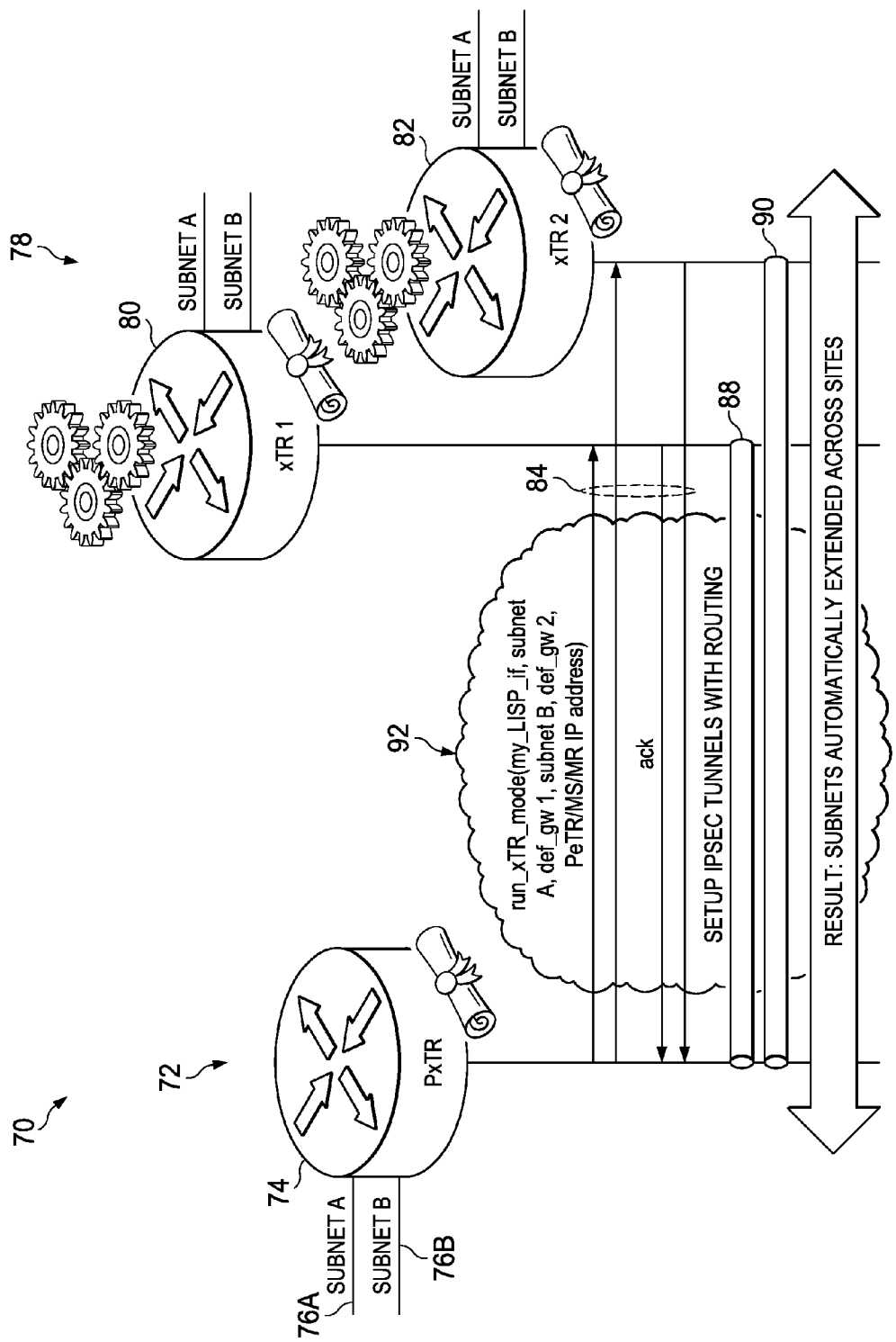
FIG. 3 is a more detailed block diagram of a system for implementing autonomic LISP for enabling a secure hybrid cloud extension in accordance with features of embodiments described herein.

Turning now to FIG. 3, illustrated therein is a more detailed block diagram of the system 70 of FIG. 2. As shown in FIG. 3, once the ACP tunnels have been established between PxTR 74 and remote nodes (xTRs 80, 82), an ACP command triggers execution of a process on the PxTR 74 causing the establishment of an IPsec tunnel with routing enabled and a new ACP message carrying LISP-specific parameters to be sent from PxTR 74 to each of the remote nodes xTR 80 and xTR 82 ("run_xTR_mode (my_LISP_if, subnet A, def_gw 1, subnet B, def_gw2, PeTR/MS/MR IP address") via respective ACP channels.

The run_xTR_mode message identifies to each remote node (i.e., xTR 80 and xTR 82) the LISP mode in which the remote node is to operate ("run_xTR_mode"), the number or index of the LISP interface ("my_LISP_if"), the subnets configured under the identified interface ("subnet A" and "subnet B") and their respective default gateways from the point of view of the enterprise ("def_gw1" and "def_gw2"), and IP addresses for each of the proxy egress tunnel router ("PeTR"), mapping server ("MS") and map resolver ("MR"). Upon receipt of the run_xTR_mode message from the PxTR 74, each of the xTRs 80, 82, responds with an acknowledge ("ack") via the respective ACP channel and proceeds to auto resolve its LISP configuration using the parameters contained in the run_xTR_mode message, as described in greater detail below.

Figure 4:
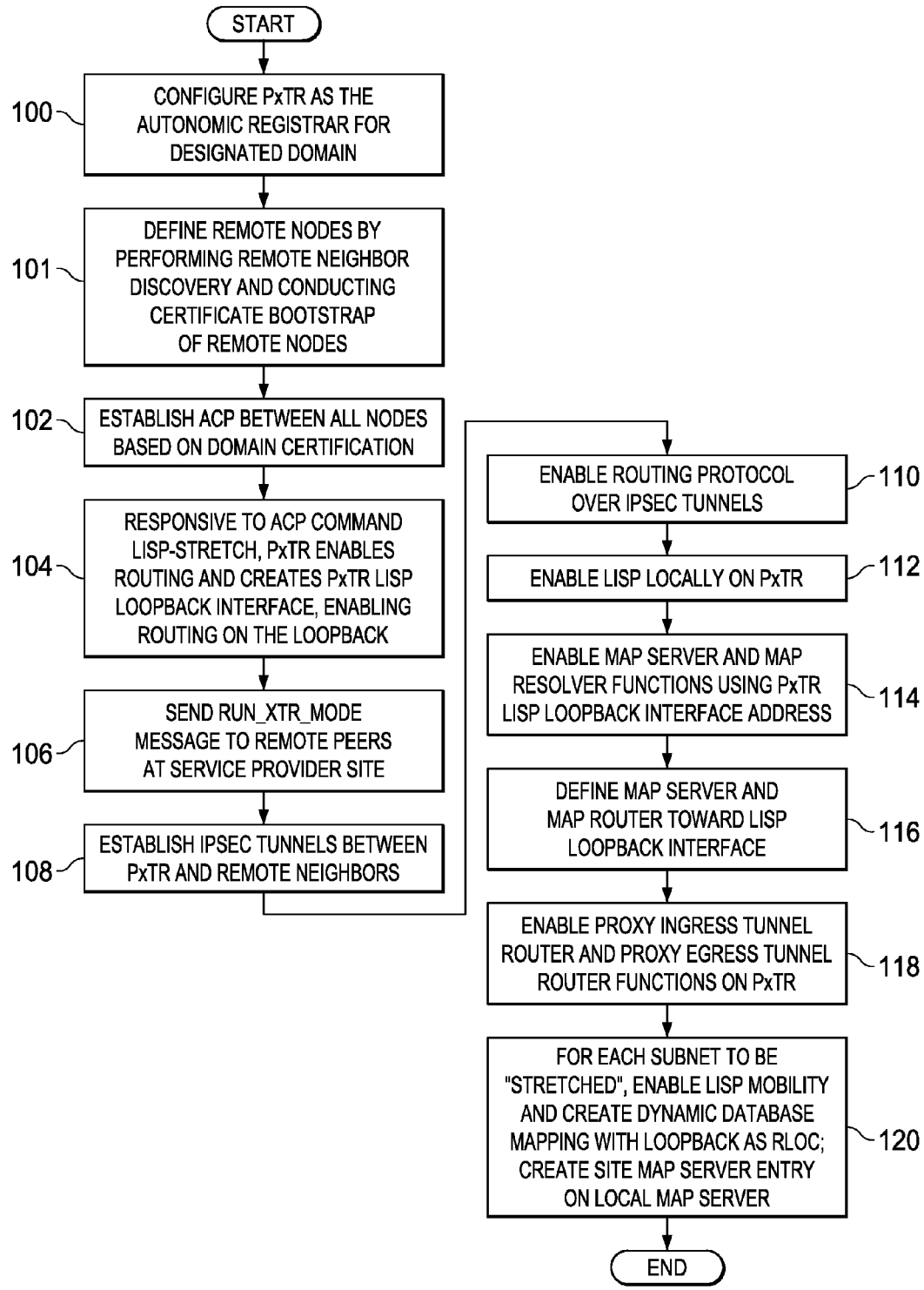
FIG. 4 is a simplified flowchart illustrating example operational steps that may be associated with a router of the enterprise side of a system for implementing autonomic LISP for enabling a secure hybrid cloud extension in accordance with features of embodiments described herein.

FIG. 4 is a flowchart illustrating a process implemented on the enterprise side (i.e., at the PxTR 74) for implementing autonomic LISP for enabling a secure hybrid cloud extension in accordance with features of embodiments described herein. Turning to FIG. 4, and referring also to FIG. 3, in step 100, PxTR 74 is configured as the autonomic registrar for the designated domain (e.g., domain-ID "example.com"). In step 101, remote nodes (xTR 80, 82) are defined. In particular, PxTR performs remote neighbor discovery with xTR 80 and xTR 82 and conducts certificate bootstrap of those nodes, with automatic enrollment of domain certificates.

If two autonomic devices use the same trust anchor, or registrar, they can verify each other's certificate thus establishing that the peer is a member of the same domain. An autonomic device signs its neighbor discovery packets using a domain certificate from the domain registrar, if available. If a domain certificate is not available, the autonomic device signs its neighbor discover packets using a vendor certificate or a self-signed certificate.

Returning to FIG. 4, in step 102, the ACP is established between all nodes based on domain certification. In step 104, triggered by the ACP command "lisp-stretch," PxTR enables routing and creates a PxTR LISP loopback interface, which in one embodiment is IPv6, ULA based, and routing is enabled on the loopback. The configuration of the loopback interface ensures that every map-notify message received by the PxTR will always be sent to the LISP process.

In step 106, a "run_xTR_mode" message with parameters is sent to the remote peers at the SP site (i.e., xTR 80 and xTR 82). The run_xTR_mode message identifies the PxTR LISP loopback, as well as the subnets that are to be stretched, along with their respective default gateways. In step 108, IPsec tunnels 90, 88, from PxTR 72 to xTRs 80 and 82 are established. This can be accomplished using the domain certificate to authenticate xTR IPsec peer. Outer IP addresses and domain certificate are already known. In certain embodiments, inner IP addresses may be IPv6 link local/IPv4 unnumbered. In step 110, a routing protocol is enabled over IPsec tunnels. One of any number of different routing protocols, including but not limited to Open Shortest Path First ("OPSF"), Intermediate System to Intermediate System ("IS-IS"), and Enhanced Interior Gateway Routing Protocol ("EIGRP"), may be employed.

In step 112, LISP is enabled locally on the PxTR. In step 114, map server ("MS") and map resolver ("MR") functions are enabled using the PxTR LISP loopback interface address. In certain embodiments, the key may be hard-coded, as IPsec provides security; alternatively, the key may be negotiated using domain certificates. In step 116, the MR and MS are defined toward the LISP loopback interface. In step 118, proxy ingress tunnel router ("PiTR") and PeTR functions are enabled on the PxTR. In step 120, for each interface labeled with "lisp-stretch", LISP mobility is enabled and a dynamic database mapping with loopback as a local routing locator ("RLOC") with incremental "map notify" group is created (site local multicast). Additionally a site map server entry is created on the local MS.

Figure 5:
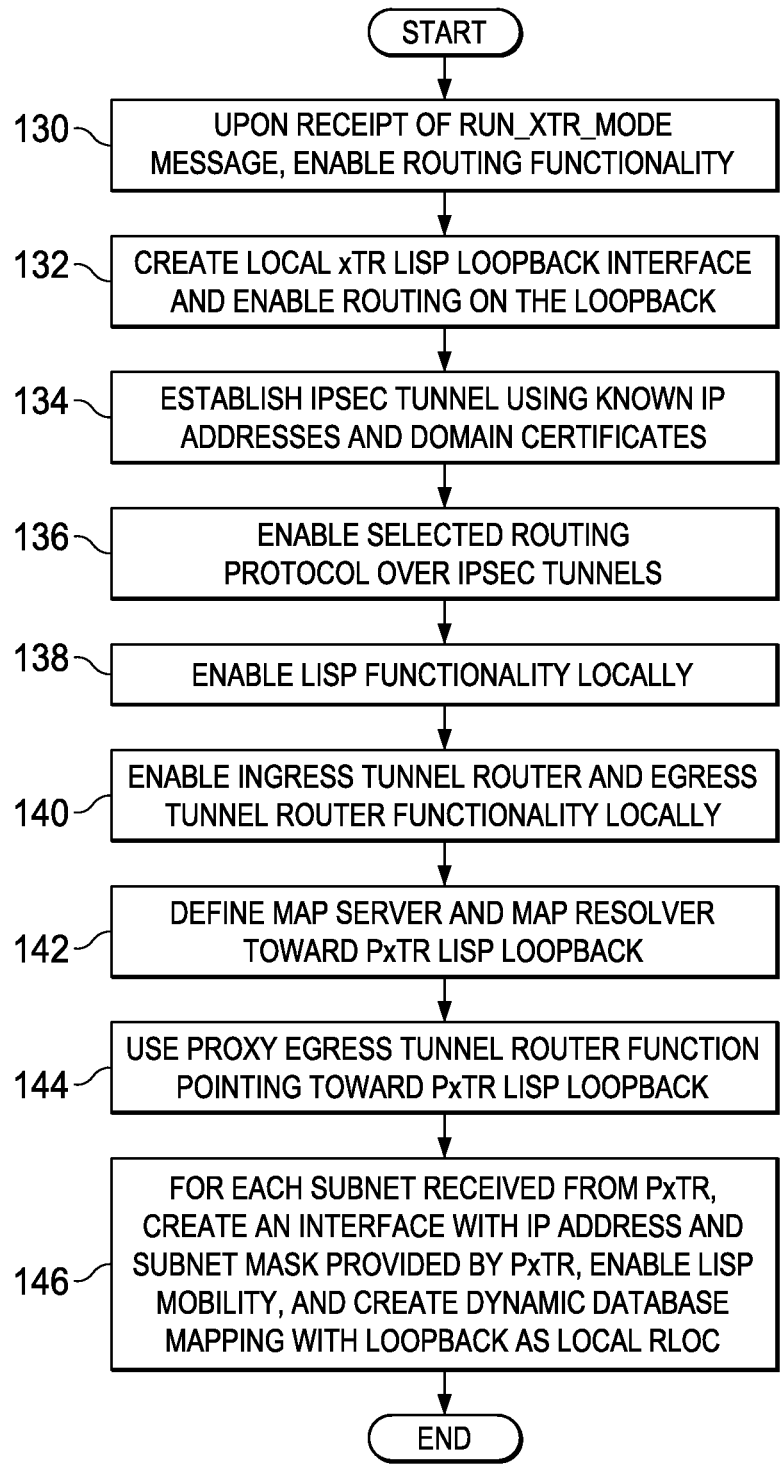
FIG. 5 is a simplified flowchart illustrating example operational steps that may be associated with a router of the service/cloud provider side of a system for implementing autonomic LISP for enabling a secure hybrid cloud extension in accordance with features of embodiments described herein.

Turning now to FIG. 5, illustrated therein is a flowchart illustrating operation of a process executed at each of the xTRs 80, 82, for implementing autonomic LISP for enabling a secure hybrid cloud extension in accordance with features of embodiments described herein. In step 130, upon receipt of the "run_xtr_mode" message from PxTR, the xTR enables routing functionality. In step 132, the xTR creates a local xTR LISP loopback interface, as on the PxTR, and enables routing on the loopback. In step 134, the xTR establishes an IPsec tunnel to the PxTR (symmetric to the IPsec tunnel from the PxTR) using the IP addresses and domain certificate that are already known. In step 136, the xTR enables the selected routing protocol over IPsec tunnels. In step 138, the xTR enables LISP locally. In step 140, the xTR enables ITR and ETR functionality. In step 142, the xTR defines MR and MS toward the PxTR LISP loopback. In step 144, the xTR uses the PeTR function pointing toward PxTR LISP loopback. In step 146, for each subnet received from PxTR, xTR creates an interface with IP address and subnet mask provided by PxTR, enables LISP mobility, and creates dynamic database mapping with loopback as local RLOC with incremental "map-notify" group (site local mcast). Upon completion of step 146, the LISP-enabled secure hybrid cloud extension has been established.

Figure 6:
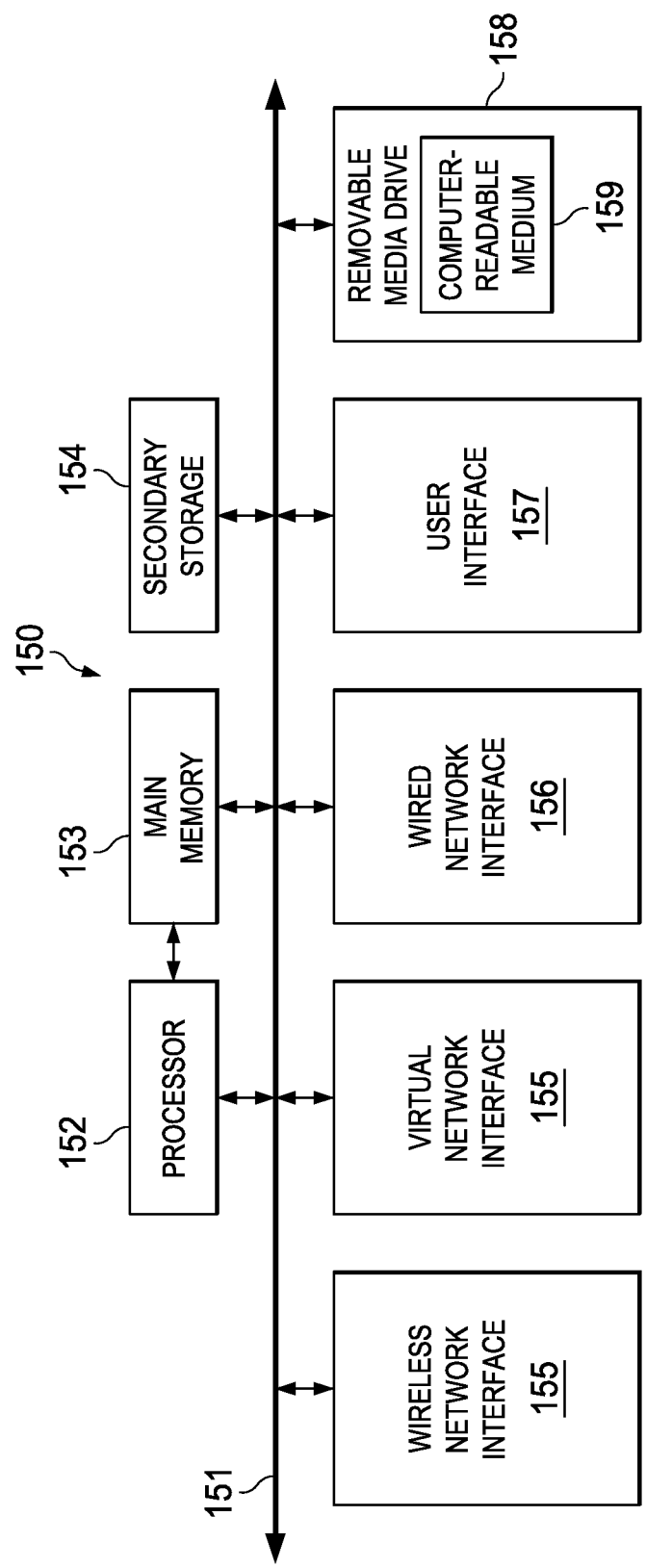
FIG. 6 is a simplified block diagram illustrating components of an example machine capable of executing instructions in a processor, such as a router on either the enterprise side or the service/cloud provider side of a system for implementing autonomic LISP for enabling a secure hybrid cloud extension in accordance with features of embodiments described herein.

Turning to FIG. 6, FIG. 6 is a simplified block diagram of an example machine (or apparatus) 150, which in certain embodiments may comprise a router, such as an PxTR or xTR, that may be implemented a system for implementing autonomic LISP for enabling a secure hybrid cloud extension in accordance with features of embodiments described herein. The example machine 150 corresponds to network elements and computing devices that may be deployed in system 70, including, for example, PxTR 74, xTR 80, and xTR 82. In particular, FIG. 6 illustrates a block diagram representation of an example form of a machine within which software and hardware cause machine 150 to perform any one or more of the activities or operations discussed herein. As shown in FIG. 6, machine 150 may include a processor 152, a main memory 153, secondary storage 154, a wireless network interface 155, a wired network interface 156, a user interface 157, a removable media drive 158 including a computer-readable medium 159, and a virtual network interface 160. A bus 151, such as a system bus and a memory bus, may provide electronic communication between processor 152 and the memory, drives, interfaces, and other components of machine 150. Machine 150 may be a physical or a virtual appliance, for example a virtual router running on a hypervisor or running within a container.

Processor 152, which may also be referred to as a central processing unit ("CPU"), can include any general or special-purpose processor capable of executing machine readable instructions and performing operations on data as instructed by the machine readable instructions. Main memory 153 may be directly accessible to processor 152 for accessing machine instructions and may be in the form of random access memory ("RAM") or any type of dynamic storage (e.g., dynamic random access memory ("DRAM")). Secondary storage 154 can be any non-volatile memory such as a hard disk, which is capable of storing electronic data including executable software files. Externally stored electronic data may be provided to computer 150 through one or more removable media drives 158, which may be configured to receive any type of external media such as compact discs ("CDs"), digital video discs ("DVDs"), flash drives, external hard drives, etc.

Wireless, wired and virtual network interfaces 155, 156, and 160, can be provided to enable electronic communication between machine 150 and other machines (e.g., new device 20, existing device 30, registration server 40, signing authority 60, certification authority 50) via networks (e.g., domain 15, wide area network 5). In one example, wireless network interface 155 could include a wireless network controller ("WNIC") with suitable transmitting and receiving components, such as transceivers, for wirelessly communicating within a network. Wired network interface 156 can enable machine 150 to physically connect to a network by a wire line such as an Ethernet cable. Both wireless and wired network interfaces 155 and 156 may be configured to facilitate communications using suitable communication protocols such as, for example, Internet Protocol Suite ("TCP/IP"). Machine 150 is shown with both wireless and wired network interfaces 155 and 156 for illustrative purposes only. While one or more wireless and hardwire interfaces may be provided in machine 150, or externally connected to machine 150, only one connection option is needed to enable connection of machine 150 to a network.

A user interface 157 may be provided in some machines to allow a user to interact with the machine 150. User interface 157 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, and an application programming interface (API), etc.

Removable media drive 158 represents a drive configured to receive any type of external computer-readable media (e.g., computer-readable medium 159). Instructions embodying the activities or functions described herein may be stored on one or more external computer-readable media. Additionally, such instructions may also, or alternatively, reside at least partially within a memory element (e.g., in main memory 153 or cache memory of processor 152) of machine 150 during execution, or within a non-volatile memory element (e.g., secondary storage 154) of machine 150. Accordingly, other memory elements of machine 150 also constitute computer-readable media. Thus, "computer-readable medium" is meant to include any medium that is capable of storing instructions for execution by machine 150 that cause the machine to perform any one or more of the activities disclosed herein.

Not shown in FIG. 6 is additional hardware that may be suitably coupled to processor 152 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 150 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 150 to appropriately manage the operation of the hardware components therein.

The elements, shown and/or described with reference to machine 70, are intended for illustrative purposes and are not meant to imply architectural limitations of machines such as those utilized in accordance with the present disclosure. In addition, each machine, PxTR 74, xTR 80, and xTR 82, may include more or fewer components where appropriate and based on particular needs and may run as virtual machines or virtual appliances. As used herein in this Specification, the term "machine" is meant to encompass any computing device or network element such as servers, virtual servers, logical containers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system for enabling unconfigured devices to securely join an autonomic network, outlined herein may be implemented in software in, for example, PxTR 74, xTR 80 and xTR 82. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, PxTR 74, xTR 80, and xTR 82 are network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system for enabling unconfigured devices to securely join an autonomic network, described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 73, secondary storage 74, computer-readable medium 79) can store data used for the automatic configuration and registration operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 72) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of network environment 10 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system for automatically configuring and registering an unconfigured device in an autonomic network, as shown in the FIGURES, and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
   configuring a local network element as an autonomic registrar for a designated network domain;
   establishing an autonomic control plane ("ACP") between the local network element and one or more remote network elements identified by the local network element as a remote neighbor;
   designating a locally-defined subnet at the local network element to be extended to each of the one or more remote network elements; and
   executing an ACP command at the local network element, wherein the executing triggers a message to each of the one or more remote network elements, the message including information regarding the designated local subnet;
   wherein the information included in the message is used by each of the remote network elements to auto-resolve Locator/Identifier Separation Protocol ("LISP") configuration of the remote network element, thereby enabling the designated local subnet to be extended to each of the one or more remote network elements.

2. The method of claim 1, wherein the message is sent via the ACP.

3. The method of claim 1, wherein the information included in the message identifies at least one of a LISP mode in which the remote network element is to operate, an index of a LISP interface, the designated local subnets, a default gateway for each of the designated local subnets, an Internet Protocol ("IP") address for a proxy egress tunnel router ("PeTR"), an IP address for a map server function, and an IP address for a map resolver function.

4. The method of claim 1, wherein the local network element is deployed in an enterprise data center and the one or more remote network elements are deployed in a public cloud network.

5. The method of claim 1, wherein each of the local network element and the one or more remote network elements are LISP-enabled routers.

6. The method of claim 1 further comprising:
   creating at the local network element a local LISP loopback interface and enabling routing on the local LISP loopback interface;
   establishing secure IP tunnels between the local network element and each of one or more remote network elements.

7. The method of claim 1, wherein the local network element comprises a proxy ingress/egress tunnel router ("PxTR") and each of the one or more remote network elements comprises an ingress/egress tunnel router ("xTR").

8. Non-transitory tangible media that includes code for execution and when executed by a processor is operable to perform operations comprising:
   configuring a local network element as an autonomic registrar for a designated network domain;
   establishing an autonomic control plane ("ACP") between the local network element and one or more remote network elements identified by the local network element as a remote neighbor;
   designating a locally-defined subnet at the local network element to be extended to each of the one or more remote network elements; and
   executing an ACP command at the local network element, wherein the executing triggers a message to each of the one or more remote network elements, the message including information regarding the designated local subnet;
   wherein the information included in the message is used by each of the remote network elements to auto-resolve Locator/Identifier Separation Protocol ("LISP") configuration of the remote network element, thereby enabling the designated local subnet to be extended to each of the one or more remote network elements.

9. The media of claim 8, wherein the message is sent via the ACP.

10. The media of claim 8, wherein the information included in the message identifies at least one of a LISP mode in which the remote network element is to operate, an index of a LISP interface, the designated local subnets, a default gateway for each of the designated local subnets, an Internet Protocol ("IP") address for a proxy egress tunnel router ("PeTR"), an IP address for a map server function, and an IP address for a map resolver function.

11. The media of claim 8, wherein each of the local network element and the one or more remote network elements are LISP-enabled routers.

12. The media of claim 8, wherein the operations further comprise:
   creating at the local network element a local LISP loopback interface and enabling routing on the local LISP loopback interface;
   establishing secure IP tunnels between the local network element and each of one or more remote network elements.

13. The media of claim 8, wherein the local network element comprises a proxy ingress/egress tunnel router ("PxTR") and each of the one or more remote network elements comprises an ingress/egress tunnel router ("xTR").

14. An apparatus comprising:
   a memory element configured to store data; and
   a processor operable to execute instructions associated with the data;
   wherein the apparatus:
      configures a local network element as an autonomic registrar for a designated network domain;
      establishes an autonomic control plane ("ACP") between the local network element and one or more remote network elements identified by the local network element as a remote neighbor;
      designates a locally-defined subnet at the local network element to be extended to each of the one or more remote network elements; and
      executes an ACP command at the local network element, wherein the executing triggers a message to each of the one or more remote network elements, the message including information regarding the designated local subnet;

wherein the information included in the message is used by each of the remote network elements to auto-resolve Locator/Identifier Separation Protocol ("LISP") configuration of the remote network element, thereby enabling the designated local subnet to be extended to each of the one or more remote network elements.

15. The apparatus of claim 14, wherein the message is sent via the ACP.

16. The apparatus of claim 14, wherein the information included in the message identifies at least one of a LISP mode in which the remote network element is to operate, an index of a LISP interface, the designated local subnets, a default gateway for each of the designated local subnets, an Internet Protocol ("IP") address for a proxy egress tunnel router ("PeTR"), an IP address for a map server function, and an IP address for a map resolver function.

17. The apparatus of claim 14, wherein the local network element is deployed in an enterprise data center and the one or more remote network elements are deployed in a public cloud network.

18. The apparatus of claim 14, wherein each of the local network element and the one or more remote network elements are LISP-enabled routers.

19. The apparatus of claim 14, wherein the local network element comprises a proxy ingress/egress tunnel router ("PxTR").

20. The apparatus of claim 14, wherein each of the one or more remote network elements comprises an ingress/egress tunnel router ("xTR").

* * * * *